United States Patent Office 3,334,067
Patented Aug. 1, 1967

3,334,067
METHOD OF MAKING ONE COMPONENT ROOM TEMPERATURE CURING SILOXANE RUBBERS
Donald R. Weyenberg, Midland, Mich., assignor to Dow Corning Corporation, Midland, Mich., a corporation of Michigan
No Drawing. Filed Apr. 8, 1966, Ser. No. 541,113
8 Claims. (Cl. 260—46.5)

ABSTRACT OF THE DISCLOSURE

A method for preparing a one package room temperaturee curable silicone rubber which is stable in the absence of moisture but cures upon exposure to moisture. The method comprises mixing in the absence of moisture a hydroxylated siloxane polymer of the formula

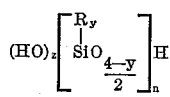

a silane of the formula R'Si(OR")$_3$ and a beta-dicarbonyl titanium compound of the formula

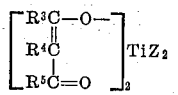

The compositions prepared by this process are also disclosed.

---

This application is a continuation-in-part of applicant's copending application Ser. No. 195,381, filed May 17, 1962, which is a continuation-in-part of applicant's copending application Ser. No. 145,443, filed Oct. 16, 1961, both abandoned.

This invention relates to one package room temperature curing silicone rubber which is catalyzed by a titanium IV compound containing at least one ligand derived from an organic compound containing the beta-dicarbonyl structural unit. These titanium compounds will be referred to as beta-dicarbonyl titanium compounds for the puropse of this invention.

It is known from U.S. Patent 2,843,555 that a hydroxyl endblocked polysiloxane can be mixed with alkyl-silicates and with alkyl tianates whereupon the mixture spontaneously cures to a rubber. However, as taught in this patent, the curing takes place spontaneously upon mixing the three ingredients and is complete within from 15 minutes to 2 days. Thus, the material must be used soon after the catalyst, silicate and siloxane are mixed.

This type of silicone rubber is known as a two component system because in commercial operation, one must supply the customer with two packages, one of which would contain the catalyst and the other a mixture of silicate atnd siloxane. The user would then proceed to mix these two components when he desired to use the product. Such a two component sysetem is one of many which are known in the siloxane art. In general, they comprise a polymer, a cross-linker and a catalyst and the three components are always mixed just prior to use and the use of the material must be complete prior to gelation. Once gelation has occurred, it is no longer possible to employ the rubber to fabricate usable articles or to impregnate porous materials.

Obviously, such two component systems, although commercially feasible in many cases, are subject to serious limitations. One of these is the fact that the material must be used shortly after mixing. The second is that if for any reason one cannot employ a material shortly after mixing, the whole batch can be lost. Consequently, it would be highly advantageous to have a system which does not require any mixing by the user prior to use and which can be kept in a usable form indefinitely after all the ingredients have been mixed.

It is the object of this invention to provide a one component room temperature curing siloxane elastomer system which can be stored for prolonged periods of time and yet which will cure spontaneously upon exposure to atmospheric moisture. Another object is to provide a material which is usable as a sealant, an electrical insulation material and as a coating composition. Other objects and advantages will be apparent from the following description.

In accordance with this invention, a siloxane rubber composition is prepared by mixing in the absence of moisture (1) a siloxane having a viscosity of at least 25 cs. at 25° C. and being of the average formula

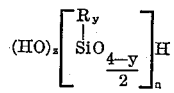

in which z has an average value from 1 to 1.01 inclusive, y has an average value from 1.99 to 2 inclusive, the sum of z+y being 3, R is selected from the group consisting of monovalent hydrocarbon radicals, monovalent halohydrocarbon radicals and monovalent cyanoalkyl radicals, all of not more than 18 carbon atoms, and n is an integer, (2) a silane of the formula R'Si(OR")$_3$ in which R' is of the group, monovalent hydrocarbon radicals, monovalent halohydrocarbon radicals and monovalent cyanoalkyl radicals, all of 1 to 18 carbon atoms and R" is of the group haloaliphatic hydrocarbon radicals having no halogen alpha to the oxygen and aliphatic hydrocarbon radicals both of less than 5 carbon atoms, (2) being present in amount such that there is at least .5 mol of silane per mol of a silicon-bonded hydroxyl in (1) and (3) at least .1 percent by weight based on the weight of (1) of a beta-dicarbonyl titanium compound, a formula

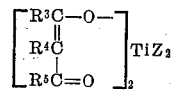

in which R$^3$ is a monovalent hydrocarbon radical having from 1 to 18 inclusive carbon atoms, R$^4$ is monovalent radical selected from the group consisting of hydrocarbon radicals having from 1 to 18 inclusive carbon atoms, and hydrogen atoms, R$^5$ is a monovalent radical selected from the group consisting of hydrocarbon radicals and aliphatic hydrocarbonoxy radicals, each having from 1 to 18 inclusive carbon atoms, and Z is a radical selected from the group consisting of monovalent aliphatic hydrocarbonoxy radicals, monovalent acyloxy radicals each having from 1 to 18 inclusive carbon atoms, hydroxyl radicals and divalent oxygen atoms forming a TiOTi linkage.

The term "in the absence of moisture" as used above, includes both liquid water and water vapor including atmospheric moisture.

It has been found that when the above three ingredients are mixed in the absence of water, that an interaction takes place at room temperature or above to produce a material which is stable in the absence of moisture and can be stored for prolonged periods of time. However, this material will cure spontaneously upon exposure to moisture, including atmospheric moisture, in a matter of a few minutes to a few hours to give a rubbery material. The nature of the product formed by mixing the three ingredients in the absence of moisture is not precisely known. However, it is believed that the alkoxy groups on the silane react with the hydroxyl groups of the hydroxylated siloxane to produce siloxanes of the structure

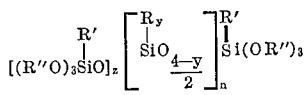

with the elimination of an alcohol, R″OH. It should be understood, however, that applicant is not limiting this invention to the production of this particular type of structure but it is entirely possible that far more complicated structures are produced and that other mechanisms may be involved.

When the β-dicarbonyl compound and the hydroxylated siloxane are first mixed, there is no substantial increase in viscosity of the siloxane as was observed with other titanium compounds. The β-dicarbonyl titanium compounds of this invention are superior to other organotitanium catalysts. The compositions of this invention are prepared easily and without viscosity increases. The compositions of this invention can be stored in the uncured state over long periods of time without losing their effective curing properties. The rapid curing rate of the uncured composition is maintained and the maximum properties of the cured product are obtained in a short period of time even after long periods of storage. The final cured products have excellent properties of tensile strength, elongation, tear and durometer.

The order of addition of the components of the compositions of this invention is not critical. Thus, one can first mix the siloxane with the silane and thereafter incorporate the β-dicarbonyl titanium compound or one can mix the siloxane with the β-dicarbonyl titanium compound and thereafter incorporate the silane or one may mix the β-dicarbonyl titanium compound with the silane and thereafter incorporate the siloxane or one can simultaneously mix all three ingredients.

In carrying out the reaction of this invention, there should be at least 0.5 mol of silane (2) per mole of hydroxyl groups in (1). The upper limit of the amount of silane employed is not critical. However, obviously, grossly excessive amounts of silane will merely dilute out the composition. Preferably, the amount of silane employed is in excess of one mol of silane per mol of silicon-bonded hydroxyl in order to protect the system from gelation due to the incidental presence of water which may be carried into the system by way of other ingredients such as fillers or stabilizing additives or which may diffuse into the system during storage.

In order to obtain a reasonable length of cure upon exposure to moisture, there should be at least 0.1 percent by weight of the beta-discarbonyl titanium compound based on the weight of (1). The upper limit of the amount of beta-dicarbonyl titanium compound is not critical, although generally speaking, there is no advantage in employing more than 10 percent by weight beta-dicarbonyl titanium compound.

For the purpose of this invention, the ingredients can be mixed at any desired temperature ranging from below room temperature up to above 200° C. Ordinarily, satisfactory results are obtained by mixing the ingredients at room temperature but often it is desirable to heat the mixture at temperatures above the volatilization point of the by-produced alcohol. It is also advantageous, but not essential, to remove the by-produced alcohol from the mixture prior to storage.

The hydroxylated siloxanes employed herein can be prepared by any of the conventional methods for preparing hydroxylated siloxanes. One such method is described in U.S. Patent No. 2,779,776. The viscosity of the hydroxylated siloxane should be at least 25 cs. at 25° C. but there is no critical upper limit to the viscosity. Thus, for example, the hydroxylated siloxane can vary from thin fluids to non-flowable gums. The particular viscosity selected will depend upon the use to which the composition is to be put. For maximum impregnation of porous materials, a low viscosity is desired. However, for maximum tensile strength and elongation in the cured rubber, gums are desired.

For the purpose of this invention, the silicon of the siloxane can be substituted with any monovalent hydrocarbon radical such as alkyl radicals, such as methyl, ethyl, propyl, hexyl or octadecyl; alkenyl radicals, such as vinyl, allyl, cyclohexenyl, hexenyl, octenyl and methallyl; cycloaliphatic hydrocarbon radicals, such as cyclopentyl, cyclohexyl, tertiary butyl cyclohexyl and methylcyclohexyl; aralkyl hydrocarbon radicals, such as benzyl, β-phenylethyl and β-phenylpropyl; and aryl hydrocarbon radicals such as phenyl, xenyl, tolyl, xylyl or naphthyl. R can also be any halogenated monovalent hydrocarbon radical, such as choloromethyl, β-chloropropyl, 3,3,3-trifluoropropyl, α,α,α-trifluorotolyl, chlorophenyl, bromoxenyl, trifluorovinyl or chlorocyclohexyl. R can also be any cyanoalkyl radical, such as β-cyanoethyl, β-cyanopropyl, gamma-cyanopropyl or omega-cyanooctadecyl.

For the purpose of this invention the hydroxylated siloxane can be either a homopolymer or a copolymer and the various R groups attached to any one silicon atom can be the same or different. As can be seen from the formula, the siloxane can be linear in structure or it can be branched in structure depending upon the value of $y$.

For the purpose of this invention, R′ can be any of the radicals shown above for R. In the silanes employed herein, R″ can be any aliphatic hydrocarbon radical of less than 5 carbon atoms, such as methyl, ethyl, propyl or butyl, or any aliphatic halohydrocarbon radical of less than 5 carbon atoms such as β-chloroethyl, delta-chlorobutyl, —$CH_2C_2F_5$, β-bromopropyl, 3-iodobutyl and 2,2,2-trifluoroethyl. Thus, specific examples of silanes which can be used are methyltriethoxysilane, ethyltrimethoxysilane, vinyltrimethoxysilane, 3,3,3-trifluoropropyltrimethoxysilane, β-cyanoethyltrimethoxysilane, propyltriisopropoxysilane, methyltributoxysilane, phenyltrimethoxysilane, octadecyltrimethoxysilane, butyltri(β-chloroethoxy)silane, 3,3,3 - trifluoropropyltri(2,2,2 - trifluoroethoxy)silane and propyltris(delta-chlorobutoxy)silane.

The beta-dicarbonyl titanium compounds of this invention can be prepared by adding β-dicarbonyl compounds such as β-diketones and B-ketoesters to reactive titanium compounds such as titanium tetrachloride and titanium orthoesters of lower aliphatic alcohols. The reaction occurs spontaneously upon mixing the beta-dicarbonyl compound and the reactive titanium compound. If the titanium tetrachloride is used as the reactive titanium compound, it must be further reacted with alcohols or organic acids to remove any remaining chlorine atoms. This invention does not provide the outstanding results when titanium bonded chlorine atoms are present. The chlorine would produce hydrogen chloride which is corrosive by nature and is also detrimental to the final cured composition.

The β-dicarbonyl titanium compounds of this invention have the general formula

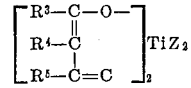

wherein $R^3$ is a monovalent hydrocarbon radical having from 1 to 18 inclusive carbon atoms, $R^4$ is a radical selected from the group consisting of monovalent hydrocarbon radicals having from 1 to 18 inclusive carbon atoms and a hydrogen atom, $R^5$ is a monovalent radical selected from the group consisting of hydrocarbon radicals and aliphatic hydrocarbonxy radicals, each having from 1 to 18 inclusive carbon atoms, and Z is a radical selected from the group consisting of monovalent aliphatic hydrocarbonoxy radicals, monovalent acyloxy radicals, each having from 1 to 18 inclusive carbon atoms, hydroxyl radicals and divalent oxygen atoms forming a TiOTi linkage.

For the purpose of this invention R³ can be any monovalent hydrocarbon radical such as methyl, ethyl, propyl, isopropyl, butyl, tertiarybutyl, amyl, xylyl, sec-amyl, phenyl, hexyl, cyclohexyl, octadecyl, allyl, and hexenyl; R⁴ can be hydrogen or any monovalent hydrocarbon radical such as the examples shown for R³; R⁵ can be any monovalent hydrocarbon radical such as the examples shown for R³ or any monovalent aliphatic hydrocarbonoxy radical such as methoxy, ethoxy, isopropoxy, allyloxy, propoxy, tertiarybutoxy, hexoxy, sec-amyloxy, and octadecyloxy. Z can be any monovalent aliphatic hydrocarbonoxy radical such as methoxy, ethoxy, isopropoxy, allyloxy, propoxy, tertiary butoxy, hexoxy, cyclohexoxy, sec-amyloxy, and octadecyloxy; or any monovalent acyloxy radical such as CH₃COO—, CH₃CH₂COO—,

CH₃(CH₂)₁₆COO—

CH₃CH₂CHCOO—, CH₃(CH₂)₃COO—, CH₃(CH₂)₁₀COO—
    |
    CH₃ and CH₃—C—CH₂COO—
       |
       CH₃

It is to be understood that partial hydrolyzates of the β-dicarbonyl titanium compounds are also operative in this invention. The partial hydrolyzate can be prepared by partially hydrolyzing the titanium compounds defined above. These partial hydrolyzates obtained have some of the Z groups replaced by divalent oxygen atoms and a TiOH or TiOTi linkage is formed.

Examples of the β-dicarbonyl titanium compounds of this invention are

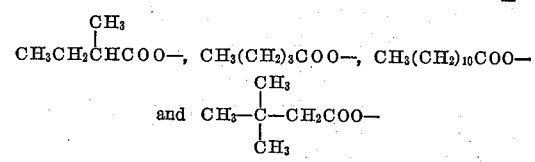

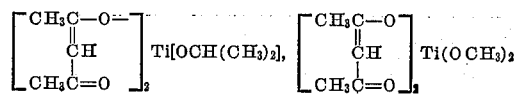

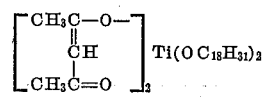

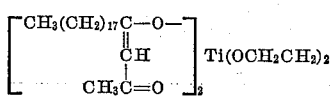

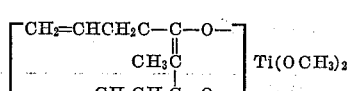

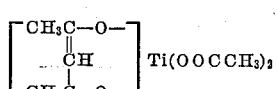

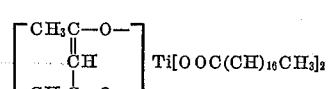

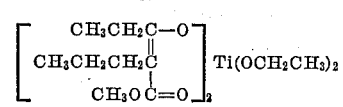

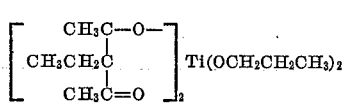

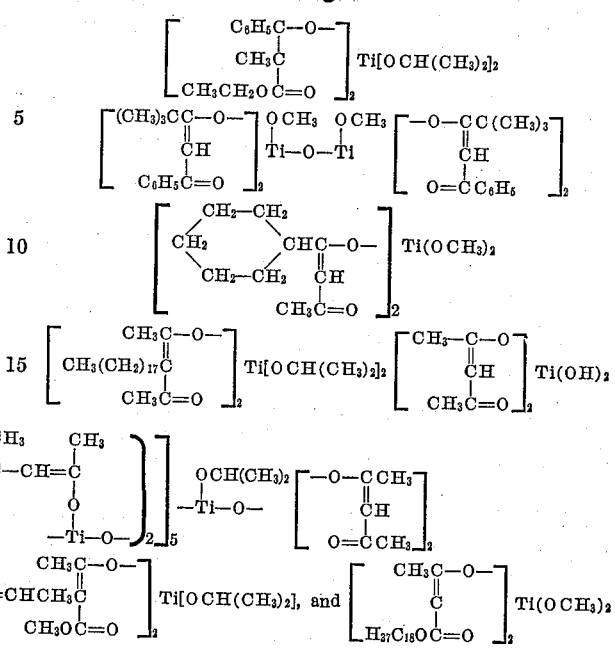

The preferred β-dicarbonyl titanium compound is bis(acetylacetonyl)diisopropyltitanate.

Thus, it can be seen that the β-dicarbonyl titanium compounds employed herein can be both monomeric and polymeric materials. They are chelated materials in which an oxygen atom is chelated with the titanium atom. In the chelate compounds, Ti can have a valence of 6 rather than just 4, and the extra valences are satisfied with the chelating oxygent atom. An example of how the chelated compounds bond can be shown by bis(acetylacetonyl)diisopropyltitanate

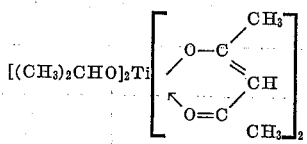

If desired, the process of this invention can include mixing other ingredients with the essential ingredients shown above. These added ingredients can include fillers which will impart desirable stress-strain properties to the resulting rubbers. Any filler normally employed in siloxane rubbers can be used in the compositions of this invention. These include organic fillers such as phthalocyanine or copper phthalocyanine and inorganic fillers such as metal oxides such as alumina, titania, zirconia, magnesia and zinc oxide; siliceous materials such as aluminum silicate, mica and glass; silica such as diatomaceous earth earth, fume silica, sand, crushed quartz, silica xerogels and precipitated silicas and carbon such as carbon black or graphite. If desired, the fillers employed herein can contain organosilyl groups attached to the surface thereof. These fillers are well-known articles of commerce.

In addition, the compositions of this invention may include plasticizers employed to lower the durometer of the cured rubber. Suitable plasticizers include trimethylsiloxy endblocked dimethylpolysiloxane fluids. In addition, the compositions of this invention may contain other ingredients to improve specific properties of the rubbers such as compression set additives, oxidation inhibitors, ultraviolet absorbers and the like.

The above added ingredients can be added to the compositions of this invention at any time but care should be taken not to introduce appreciable amounts of moisture along with the added ingredients. The compositions of this invention, with or without the added ingredients, cure spontaneously upon exposure to moisture to give rubbery products. However, they can be stored in the absence of moisture for prolonged periods of time and thus they are highly useful in calking applications, in coating applications and in the insulation of electrical equipment.

The following examples are illustrative only and should not be construed as limiting the invention which is properly set forth in the appended claims.

Example 1

100 parts by weight of a 12,000 cs. hydroxyl-endblocked dimethylpolysiloxane fluid was mixed with 40 parts by weight of a trimethylsiloxane endblocked dimethylpolysiloxane fluid as a plasticizer and 28 parts by weight of a trimethylsiloxy coated finely-divided silica having a surface area of about 350 square meters per gram.

A sample of this base was mixed in the absence of moisture with 1 part by weight of bis(acetylacetonyl)diisopropyltitanate and with 5 parts by weight methyltrimethoxysilane per 100 parts by weight of hydroxyl endblocked fluid. The resulting mixture was stable upon storage but cured upon exposure to moisture to give a rubber having a durometer of 26, a tensile strength of 270 p.s.i., and an elongation at break of 440% after curing at room temperature for 7 days.

Example 2

When 255 g. of a 57 cs. hydroxyl endblocked dimethylpolysiloxane fluid is mixed with 115 g. of methyltrimethoxysilane and 2 g. of $$\left[ \begin{array}{c} CH_3(CH_2)_5C-O- \\ \parallel \\ CH \\ | \\ CH_3C=O \end{array} \right]_2 Ti(OCH_2CH_3)_2$$

in the absence of moisture, the mixture cures to a rubbery product when exposed to the atmosphere.

Example 3

When 20 g. of a 300 cs. hydroxyl endblocked 3,3,3-trifluoropropylmethylpolysiloxane, 1.5 cc. of methyltrimethoxysilane and 0.5 cc. of

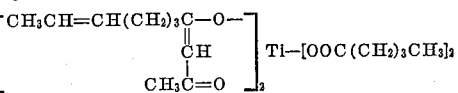

are mixed in the absence of moisture, the viscosity remains substantially the same on standing in a closed container. The product cures to a rubbery material on exposure to the atmosphere.

Example 4

When 30 g. of a 2,000 cs. hydroxyl-endblocked dimethylpolysiloxane fluid is mixed with 0.3 g. of

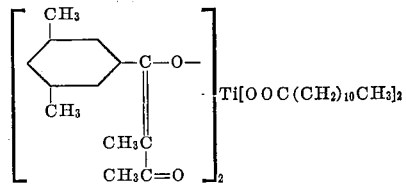

no viscosity change takes place. When 2 cc. of vinyltrimethoxysilane is mixed with the above mixture, the composition is stable in the absence of moisture, but cures upon exposure to the atmosphere.

Example 5

When the following siloxanes, silanes and beta-dicarbonyl titanium compounds, as shown in the following table, are mixed in the absence of moisture in amount so that there is at least 5 mols of silane per mol of SiOH in the siloxane and 1 percent by weight of the beta-dicarbonyl titanium compound based on the weight of the siloxane, the resulting products are stable in the absence of moisture, but will cure upon exposure to moisture to give a rubber.

| Siloxane | Silane | Beta-dicarbonyl titanate |
|---|---|---|
| $\left[ \begin{array}{c} CH_3 \\ | \\ Si \\ \end{array} \left[ \begin{array}{c} \bigcirc \\ OSi \\ | \\ CH_3 \end{array} \right]_{20} OH \right]_3$ | $CH_3Si(OC_2H_5)_3$ | $\left[ \begin{array}{c} CH_3C-O- \\ \parallel \\ CH \\ | \\ CH_3C=O \end{array} \right]_2 Ti(OCH_3)_2$ |
| $Si\left[ O\left( \begin{array}{c} C_2H_5 \\ | \\ SiO \\ | \\ CH_3 \end{array} \right)_{20} H \right]_4$ | $C_6H_5Si(OCH_3)_3$ | $\left[ \begin{array}{c} CH_3CH_2CH_2C-O- \\ \parallel \\ CH \\ | \\ CH_3C=O \end{array} \right]_2 Ti[OC(CH_3)_3]_2$ |
| $HO\left[ \left( \begin{array}{cc} C_{18}H_{37} & (CH_3)_2 \\ | & | \\ SiO & (SiO)_6 \\ | \\ CH_3 \end{array} \right) \right]_{100} H$ | $C_3H_7Si(OC_3H_7)_3$ | $\left[ \begin{array}{c} CH_3C-O- \\ \parallel \\ CH \\ | \\ CH_3C=O \end{array} \right]_2 Ti[OCH(CH_3)_2]_2$ |
| $HO\left[ \begin{array}{c} CH_2CH_2CN \\ | \\ SiO \\ | \\ CH_3 \end{array} \right]_{20} H$ | $(MeO)_3SiCH_3$ | $\left[ \begin{array}{c} (CH_3)_2CHC-O- \\ \parallel \\ CH \\ | \\ CH_3C=O \end{array} \right]_2 Ti(OCH_2CH_3)_2$ |
| $HO\left[ \begin{array}{c} C_2H_3 \\ | \\ SiO \\ | \\ CH_3 \end{array} \right]_{100} H$ | $C_2H_3Si(OCH_3)_3$ | $\left[ \begin{array}{c} CH_3C-O- \\ \parallel \\ CH \\ | \\ CH_3C=O \end{array} \right]_2 Ti[OCH(CH_3)_2]_2$ |
| $HO\left[ \begin{array}{c} Cl \\ | \\ \bigcirc \\ S \\ | \\ SiO \\ | \\ CH_3 \end{array} \right]_{25} H$ | $C_6H_{11}Si(OCH_3)_3$ | $\left[ \begin{array}{c} CH_3C-O- \\ \parallel \\ (CH_3)_2CHC \\ | \\ CH_3C=O \end{array} \right]_2 Ti[O(CH_2)_5CH_3]_2$ |

| Siloxane | Silane | Beta-dicarbonyl titanate |
|---|---|---|
| HO[CH-CH₃ / CH₂ / (SiO) / CH₃ ... C₂H₅ / (SiO)₅ / CH₃]₁₀₀ H | C₂H₅Si—(OC₃H₇)₃ | [CH₃C—O— / CH / CH₃C=O]₂ Ti[O(CH₂)₁₇CH₃]₂ |
| HO[(CH₃)₂ / SiO]₅₀₀₀ H | CH₃Si(OCH₃)₃ | [CH₃C—O— / CH / CH₃CH₂CH₂C=O]₂ Ti[OCH₂CH₂CH—(CH₃)₂]₂ |
| HO[CH₂CH₂CH₂Cl / SiO / CH₃]₁₀₀ H | CH₃Si(OCH₃)₃ | [CH₃(CH₂)₁₇C | O— / CH / CH₃C=O]₂ Ti(OCH₂CH=CH₂)₂ |
| HO[Br₄ / SiO / CH₃]₃₀ H | CH₃Si(OCH₃)₃ | [CH₃(CH₂)₃C—O— / CH₃(CH₂)₃C / CH₃C=O]₂ Ti[OCH(CH₂CH₂ / CH₂CH₂)]₂ |
| HO[(CH₃)₂ / SiO]₁₀₀₀ H | CH₃Si(OCH₃)₃ | [CH₂=CHCH₂C—O— / CH₃C / CH₃CH₂C=O]₂ Ti(OCH₃)₂ |
| HO[(CH₃)₂ / SiO]₁₀₀₀ H | (CF₃CH₂O)₃Si—CH₂CH₂CF₃ | [CH₃(CH₂)₅C—O— / CH₃C / (CH₃)₂CHC=O]₂ Ti(OOCCH₂CH₃)₂ |
| HO[(CH₃)₂ / SiO]₁₀₀ H | CH₃Si(OCH₂CH₂Cl)₃ | [CH₃C—O— / CH / CH₃C=O]₂ Ti(OOCCH₃)₂ |
| HO[(CH₃)₂ / SiO]₁₀₀ H | CH₃ / C₁₈H₃₇Si(OCH—CH₂Cl)₃ | [(CH₃)₂CHCH₂CH₂C—O— / CH / (CH₃)₂CHOC=O]₂ Ti(OOCCH₂—CHCH₃ / CH₃)₂ |
| HO[(CH₃)₂ / SiO]₂₀₀ H | CH₃Si[O(CH₂)₄Br]₃ | (CH₃CCH=CO)₂TiO—[OCH(CH₃)₂ / (OC=CHCCH₃)₂ / —TiO]₁₀ ... —Ti(OC=CHCCH₃) / OCH(CH₃)₂ / CH₃ |
| HO[(CH₃)₂ / SiO]₂₀₀ H | CH₃Si[OCH₂C₂F₅]₃ | [(CH₃)₃CC—O— / CH / C₂H₅C=O]₂ [OCH₃ / Ti—O—Ti / OCH₃] [—OC(CH₃)₃ / CH / O=CC₆H₅]₂ |

*Example 6*

When 40 g. of a 2,000 cs. hydroxyl-endblocked dimethylpolysiloxane fluid is mixed in the absence of moisture with 0.8 g. of

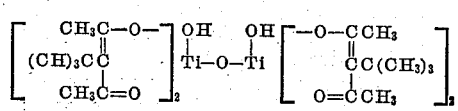

and 2 g. of vinyltrimethoxysilane, the mixture cures to a rubbery material upon exposure to the atmosphere, but when stored in a closed container no viscosity change occurs.

*Example 7*

When 150 g. of a hydroxyl-endblocked dimethylpolysiloxane gum dissolved in toluene to give a 40 weight percent solution, 12 g. of methyltrimethoxysilane and 1.5 g. of

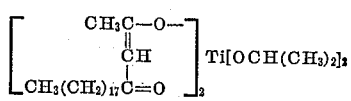

are mixed in the absence of moisture and the solution is used to coat a cotton cloth, a rubbery coating is obtained when exposed to the atmosphere.

Example 8

When 100 g. of a 500 cs. hydroxyl-endblocked dimethylpolysiloxane fluid, 1.25 cc. of methyltrimethoxysilane and 0.5 cc. of

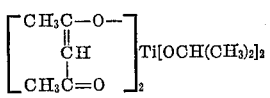

are mixed in the absence of moisture, a stable composition results when stored in a closed container but which will cure upon exposure to the atmosphere.

That which is claimed is:

1. A method for preparing a composition which is stable in the absence of moisture but which will cure upon exposure to moisture which comprises mixing in the absence of moisture
   (1) a hydroxylated siloxane having a viscosity of at least 25 cs. at 25° C. and having the average formula

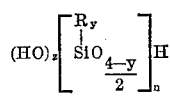

in which
   $z$ has an average value from 1 to 1.01 inclusive,
   $y$ has an average value from 1.99 to 2 inclusive, and the sum of
   $y+z$ is 3
   R is selected from the group consisting of monovalent hydrocarbon radicals, halogenated monovalent hydrocarbon radicals and monovalent cyanoalkyl radicals, all of from to 1 to 18 inclusive carbon atoms, and
   $n$ is an integer,
   (2) a silane of the formula $R'Si(OR'')_3$ in which
   R'' is selected from the group consisting of monovalent haloaliphatic hydrocarbon radicals having hydrocarbon radicals and monovalent cyanoalkyl radicals, all of from 1 to 18 inclusive carbon atoms,
   R'' is selected from the group consisting of monovalent haloaliphatic hydrocarbon radicals having no halogen alpha to the oxygen and monovalent aliphatic hydrocarbon radicals, both of less than 5 carbon atoms, and (2) being present in an amount of at least 0.5 mol of silane per mol of silicon-bonded hydroxyl in (1), and
   (3) at least 0.1% by weight based on the weight of (1) of a beta-dicarbonyl titanium compound having a formula

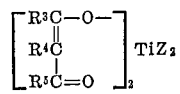

in which
   $R^3$ is a monovalent hydrocarbon radical having from 1 to 18 inclusive carbon atoms,
   $R^4$ is a monovalent radical selected from the group consisting of hydrocarbon radicals having from 1 to 18 carbon atoms and hydrogen atoms,
   $R^5$ is a monovalent radical selected from the group consisting of hydrocarbon radicals and aliphatic hydrocarbonoxy radicals each having from 1 to 18 inclusive carbon atoms, and
   Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage.

2. The method in accordance with claim 1 in which a filler (4) is included in the mixture.

3. The method in accordance with claim 1 in which R is a methyl radical and the silane in (2) is methyltrimethoxysilane.

4. The method of preparing a rubbery material which comprises preparing a composition in accordance with claim 1 and thereafter exposing the mixture to moisture whereby it cures to a rubbery material.

5. The method in accordance with claim 4 in which a filler (4) is included in the mixture.

6. A composition of matter, stable under anhydrous conditions and curable by exposure to moisture being mixed in the absence of moisture, consisting essentially of
   (1) a hydroxylated siloxane having a viscosity of at least 25 cs. at 25° C. and having the average formula

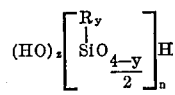

in which
   $z$ has an average value from 1 to 1.01 inclusive,
   $y$ has an average value from 1.99 to 2 inclusive, and the sum of
   $y+z$ is 3,
   R is selected from the group consisting of monovalent hydrocarbon radicals, halogenated monovalent hydrocarbon radicals and monovalent cyanoalkyl radicals all of from 1 to 18 inclusive carbon atoms, and
   $n$ is an integer,
   (2) a silane of the formula $R'Si(OR'')_3$ in which
   R' is selected from the group consisting of monovalent hydrocarbon radicals, monovalent halohydrocarbon radicals and monovalent cyanoalkyl radicals all of from 1 to 18 inclusive carbon atoms,
   R'' is selected from the group consisting of monovalent haloaliphatic hydrocarbon radicals having no halogen alpha to the oxygen and monovalent aliphatic hydrocarbon radicals, both of less than 5 carbon atoms, and (2) being present in an amount of at least 0.5 mol of silane per mole of silicon-bonded hydroxyl in (1), and
   (3) at least 0.1% by weight based on the weight of (1) of a betadicarbonyl titanium compound having a formula

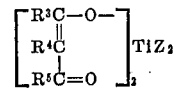

in which
   $R_3$ is a monovalent hydrocarbon radical having from 1 to 18 inclusive carbon atoms,
   $R_4$ is a monovalent radical selected from the group consisting of hydrocarbon radicals having from 1 to 18 carbon atoms and hydrogen atoms,
   $R_5$ is a monovalent radical selected from the group consisting of hydrocarbon radicals and aliphatic hydrocarbonoxy radicals each having from 1 to 18 inclusive carbon atoms,
   Z is a radical selected from the group consisting of monovalent aliphatic hydrocarbonoxy radicals and monovalent acyloxy radicals, each having from 1 to 18 inclusive carbon atoms, hydroxyl radicals and divalent oxygen atoms forming a TiOTi linkage.

7. A composition of matter in accordance with claim 6 in which (3) is bis(acetylacetonyl)diisopropyltitanate.

8. A composition of matter in accordance with claim 7 in which R is a methyl radical and (2) is methyltrimethoxysilane.

References Cited

UNITED STATES PATENTS

| | | | |
|---|---|---|---|
| 3,127,363 | 3/1964 | Nitzsche et al. | 260—46.5 |
| 3,151,099 | 9/1964 | Ceyzeriat et al. | 260—46.5 |
| 3,161,614 | 12/1964 | Brown et al. | 260—37 |

FOREIGN PATENTS

| | | |
|---|---|---|
| 583,831 | 9/1959 | Canada. |
| 1,330,625 | 5/1963 | France. |
| 962,061 | 6/1964 | Great Britain. |
| 858,065 | 1/1961 | Great Britain. |

DONALD E. CZAJA, *Primary Examiner.*

LEON J. BERCOVITZ, *Examiner.*

M. I. MARQUIS, *Assistant Examiner.*

UNITED STATES PATENT AND TRADEMARK OFFICE
CERTIFICATE OF CORRECTION

PATENT NO. : 3,334,067
DATED : August 1, 1967
INVENTOR(S) : DONALD R. WEYENBERG

It is certified that error appears in the above-identified patent and that said Letters Patent are hereby corrected as shown below:

Col. 1, line 59, delete "atnd" and insert --and--; line 61, delete "sysetem" and insert --system--.

Col. 4, line 69, delete "hydrocarbonxy" and insert --hydrocarbonoxy--.

Col. 5, line 44, delete the portion of the formula which reads "Ti[OCH($CH_3$)$_2$]" and insert --Ti[OCH($CH_3$)$_2$]$_2$--; line 53, delete the portion of the formula which reads "Ti(OCH$_2$CH$_2$)$_2$ and insert --Ti(OCH$_2$CH=CH$_2$)$_2$--; line 56, delete the portion of the formula which reads "CH$_2$=CHCH$_2$C-C-O-"
$\qquad\qquad\qquad CH_3C$
and insert --CH$_2$=CHCH$_2$C-O- --line 73, delete the portion of the
$\qquad\qquad CH_3C$
formula which reads "CH$_3$C-O" and insert --CH$_3$C-O- --.
$\quad CH_3CH_2C \qquad\qquad\qquad CH_3CH_2C$ Col. 6, line 3, delete the portion of the formula which reads "C$_6$H$_5$C-O-" should read --C$_6$H$_5$C-O- --; line 14, in the second
$\quad CH_3C \qquad\qquad\qquad\qquad CH_3C$
bracketed section, delete "CH$_3$-C-O" and insert --CH$_3$-C-O- --;
line 26, in the second bracketed section, delete "CH$_3$C-O-"
$\qquad\qquad\qquad\qquad\qquad\qquad\qquad\qquad\qquad\qquad C$
and insert --CH$_3$C-O- --; line 36, "oxygent" should read
$\qquad CH$
--oxygen--; and line 57, delete the second "earth" in that line.

UNITED STATES PATENT AND TRADEMARK OFFICE
CERTIFICATE OF CORRECTION

PATENT NO. : 3,334,067
DATED : August 1, 1967
INVENTOR(S) : DONALD R. WEYENBERG

It is certified that error appears in the above-identified patent and that said Letters Patent are hereby corrected as shown below:

Col. 8, line 15, delete "enblocked" and insert --endblocked--; in the table, the 6th formula under the heading "Beta-dicarbonyl titanate", delete the portion of the formula which reads "$(CH_3)_3CHC$" and insert --$(CH_3)_2CHC$--.

Col. 10, in the table, the 3rd formula under the heading "Beta-dicarbonyl titanate" delete the portion of the formula which reads "$CH_3(CH_2)_{17}C \mid O-$" and insert --$CH_3(CH_2)_{17}C-O-$ --;

in the table, the 9th formula under the heading "Beta-dicarbonyl titanate" delete the portion of the formula which reads "$(O\overset{\underset{|}{CH_3}}{C}=CH\ldots$ " should read -- $(O\overset{\underset{|}{CH_3}}{C}=CH\ldots$ --;
$-\overset{|}{Ti}O$    $-\overset{|}{Ti}O-$ the same formula, the portion which reads "$-\overset{\underset{|}{OCH(CH_3)_2}}{Ti}\ (O\overset{O}{\overset{\|}{C}}=CH\overset{|}{\underset{CH_3}{C}}CH_3)$ " should read -- $-\overset{\underset{|}{OCH(CH_3)_2}}{Ti}\ (O\overset{O}{\overset{\|}{C}}=CH\overset{|}{\underset{CH_3}{C}}CH_3)_2$ --;

the 10th formula, the portion which reads

"$\begin{bmatrix}(CH_3)_3C\overset{\|}{C}-O-\\ \overset{|}{CH}\\ C_2H_5\overset{|}{C}=O\end{bmatrix}$ " should read -- $\begin{bmatrix}(CH_3)_3C\overset{\|}{C}-O-\\ \overset{|}{CH}\\ C_6H_5\overset{|}{C}=O\end{bmatrix}$ --.

UNITED STATES PATENT AND TRADEMARK OFFICE
CERTIFICATE OF CORRECTION

PATENT NO. : 3,334,067
DATED : August 1, 1967
INVENTOR(S) : DONALD R. WEYENBERG

It is certified that error appears in the above-identified patent and that said Letters Patent are hereby corrected as shown below:

Col. 11, delete the following portion of Claim 1:

" (2) a silane of the formula $R'Si(OR)_3$ in which

R" is selected from the group consisting of monovalent haloaliphatic hydrocarbon radicals having hydrocarbon radicals and monovalent cyanoalkyl radicals, all of from 1 to 18 inclusive carbon atoms, "

and substitute

-- (2) a silane of the formula $R'Si(OR)_3$ in which

R' is selected from the group consisting of monovalent hydrocarbon radicals, monovalent halohydrocarbon radicals and monovalent cyanoalkyl radicals, all of from 1 to 18 inclusive carbon atoms, --

Col. 12, line 61, "$R_3$" should read --$R^3$--; line 63, "$R_4$" should read --$R^4$--; and line 66, "$R_5$" should read --$R^5$--.

Signed and Sealed this

Sixth Day of September 1977

[SEAL]

Attest:

RUTH C. MASON
Attesting Officer

LUTRELLE F. PARKER
Acting Commissioner of Patents and Trademarks